United States Patent
Ilmarinen et al.

(10) Patent No.: US 6,929,098 B2
(45) Date of Patent: Aug. 16, 2005

(54) ARRANGEMENT FOR LUBRICATING BEARING SURFACES OF A TOOL OF A HYDRAULIC IMPACT HAMMER

(75) Inventors: Jouko Ilmarinen, Rannila (FI); Ossi Kahra, Nastola (FI); Mika Oksman, Hollola (FI); Timo Sippus, Hollola (FI)

(73) Assignee: Sandvik Tamrock Oy, Tampere (FI)

( * ) Notice: Subject to any disclaimer, the term of this patent is extended or adjusted under 35 U.S.C. 154(b) by 198 days.

(21) Appl. No.: 10/325,733

(22) Filed: Dec. 23, 2002

(65) Prior Publication Data
US 2003/0121725 A1 Jul. 3, 2003

(30) Foreign Application Priority Data
Dec. 21, 2001 (FI) .............................. 20012571

(51) Int. Cl.[7] .............................. F16H 11/10
(52) U.S. Cl. .................. 184/50.1; 184/40; 184/7.4
(58) Field of Search ............... 184/7.4, 18, 40, 184/50.1

(56) References Cited

U.S. PATENT DOCUMENTS 3,595,342 A * 7/1971 O'Leary .................... 184/39.1
4,047,595 A    9/1977 Baker, Jr.
5,060,761 A    10/1991 Arndt et al.
5,160,814 A * 11/1992 Petermann .................. 181/106
5,673,669 A * 10/1997 Maley et al. ................ 123/446
6,390,034 B1 * 5/2002 Orzal et al. ............ 123/73 AD
6,543,276 B2 * 4/2003 Murphy et al. ............ 73/61.63

FOREIGN PATENT DOCUMENTS

| EP | 0 525 498 A3 | 2/1993 |
| EP | 0 525 498 B1 | 2/1993 |
| EP | 0 525 498 A2 | 2/1993 |

* cited by examiner

Primary Examiner—David M. Fenstermacher
(74) Attorney, Agent, or Firm—Burns, Doane, Swecker & Mathis, L.L.P.

(57) ABSTRACT

An arrangement for lubricating the bearing surfaces between a tool of a hydraulic impact device and the impact device, the arrangement comprising a supply pump and a channel for supplying lubricant. The arrangement comprises at least two separate channels (19, 20), and both channels comprise a separate dosing pump (17, 18) which supply predetermined amounts of lubricant between the bearing surfaces when the impact device starts.

4 Claims, 3 Drawing Sheets

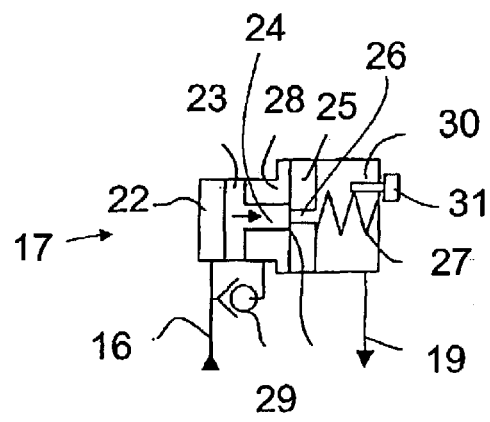
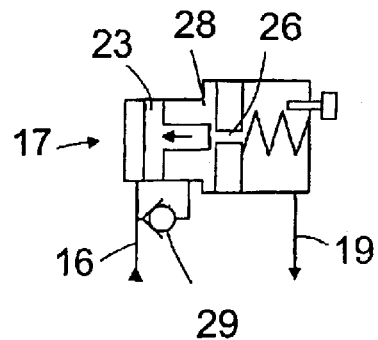
FIG. 2A      FIG. 2B
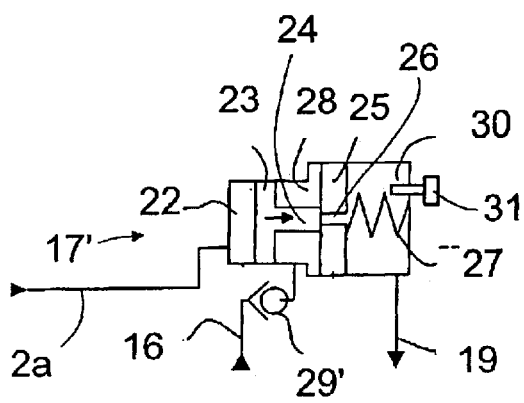
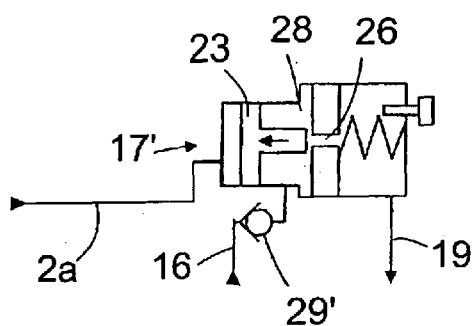
FIG. 4A      FIG. 4B

ARRANGEMENT FOR LUBRICATING BEARING SURFACES OF A TOOL OF A HYDRAULIC IMPACT HAMMER

BACKGROUND OF THE INVENTION

The invention relates to an arrangement for lubricating the bearing surfaces between a tool of a hydraulic impact device and the impact device, the arrangement comprising a supply pump and at least one channel leading to the space between the bearing surfaces for supplying lubricant.

A hydraulic impact hammer comprises a tool which moves in the longitudinal direction backwards and forwards by the effect of the impact mechanism striking it. Such a tool is continuously subject to great loads; particularly when the impact hammer is moved or turned with a boom attached to a base, such as an excavator or the like suitable base, extremely great side forces may be generated in the movement range of the blade. Such forces, in turn, cause very high surface pressures for the bearing surfaces, which may damage the bearing. Further, a stroke of a percussion piston at the end of the tool causes, depending on the material to be handled, the tool to move rapidly forwards or, if the base is hard, the surface of the tool to vibrate nearly stationarily in rather an intensive manner.

Typically, the tool is implemented with either a long bearing bushing or with two separate bearing bushings at a distance from each other. A pair of bearings, i.e. bearing surfaces sliding relative to each other, is formed of the outer surface of the tool, which functions as the inner bearing surface, and correspondingly the inner surface of the bearing bushings, which functions as the outer bearing surface. In some solutions, the frame of the impact hammer is used as the outer bearing surface without separate bearing bushings. In these solutions, the materials of the bearings can vary in such a way that the tool material is usually hardened tempering steel, the bearing bushing material being carbonization-hardened steel or a bronze-based material.

Either grease or oil is used as the lubricant in the impact hammer, and the aim is to supply lubricant between the sliding surfaces to prevent a metal-metal contact and, at the same time, to even out the surface pressure between the surfaces. In particular, it has been observed that very point-like or line-like metal-metal contacts are disadvantageous and cause a great deal of wearing or, in some cases, even cracks close to the edges of the bearing surfaces. Generally, it can be said that lubrication aims at preventing the wearing of the bearing surfaces and the fastening of the metal parts to each other.

When aiming at a good lubrication result, it is particularly important to apply lubricant to such areas of the bearing surface that are known to have high surface pressures. In a hydraulic impact hammer, this refers to the upper and lower edges of the bearings in the axial direction of the bearing. This is even more important in cases where the bearing surfaces are already worn, whereby the tool may take its place more obliquely than originally relative to the centre line of the bearing.

In order to provide lubrication of the bearing and generally to ensure the lubrication, the aim has been, more and more, to replace manual lubrication used previously with automatic lubrication. In continuous automatic lubrication, there is a channel leading from the upper part of the impact hammer through its frame structure to the lower frame, and further to the bearing surfaces to be lubricated, the lubricant being supplied via the channel separately to the bearing surfaces of the tool. The lower frame, i.e. the frame part of the impact hammer around the tool, is provided with several separate branch channels to the bearing surfaces from the inlet channel of the lubricant so as to supply lubricant to different bearing surfaces. This does not, however, guarantee the supply to the intended objects of lubrication. The lubricant flow is hindered by drying of the lubricant and the resulting partial or complete clogging of the channels, the viscosity of the lubricant, great accelerations of the impact hammer during operation, the tightness of the bearings to be lubricated, the position of the impact hammer during operation, as well as dirt and moisture. In practice, it can be said that the lubricant flows along the route that is least throttled, whereby lubrication objects positioned further away as well as narrower bearing openings easily remain without lubrication when the lubricant pushes its way out through the shortest and widest route.

EP publication 0525498 discloses a solution in which the junctions of the supply channel for the lubricant and the branch channels leading to the bearings are provided with adjustable throttling elements, the aim of which is to control the flow of the lubricant. In practice, however, the problem is that although originally the lubricant could be made flow reliably to the bearing surfaces at given temperatures, for example changes in the temperature as well as dirt and drying of the lubricant will, in the long run, cause the same problems as there would be without these adjustable throttling elements.

BRIEF DESCRIPTION OF THE INVENTION

An object of the invention is to provide such an arrangement for supplying lubricant to the bearing surfaces of a tool of an impact hammer with which the supply of the lubricant can be implemented as reliably as possible. The arrangement according to the invention is characterized in that it comprises at least two separate channels for supplying lubricant between the bearing surfaces separately, at at least two points positioned at a distance from each other in the axial direction of the tool; that separate dosing pumps serve as the supply pump for the lubricant in each of the two channels; that the dosing pumps operate at the pressure of the medium supplied to them in such a way that when pressurized medium is supplied to the working cylinders of the dosing pumps, the dosing pumps supply lubricant doses of a predetermined amount along the two channels to the space between the bearing surfaces, and when the pressure is reduced in the working cylinders of the dosing pumps, their pistons return to the rest position and load at the same time a new dose of lubricant to be supplied between the bearing surfaces when pressurized medium is next supplied to them.

An essential idea of the invention is that lubricant is supplied to the bearing surfaces of the impact hammer along two separate supply channels in such a way that each supply channel has a dosing pump of its own which supplies a given dose of lubricant at suitable intervals along its supply channel to the bearing point to which the branch channels from the supply channel are connected. In this way, lubricant can be controlled and supplied uniformly to the front and rear ends of the bearing irrespective of how their clearings or other aspects, such as drying of the lubricant, otherwise affect the condition of the channel system. In accordance with a preferred embodiment of the invention, a separate lubricant supply pump and, after the supply pump, two parallel dosing pumps are used, the two dosing pumps supplying lubricant to their own supply channels. In accordance with a second preferred embodiment of the invention, the supply pump is a pump that operates by means of the hydraulic fluid of the impact hammer and supplies lubricant each time pressurized hydraulic fluid is supplied to the impact device, returning to its initial position when the impact device stops operation. An essential idea of a third preferred embodiment of the invention is that the dosing pumps are periodically operating and supply lubricant from one end when pressurized lubricant is supplied to them and return to the initial position when the supply of the pressurized lubricant ceases, being at the same time filled with lubricant. In accordance with a fourth preferred embodiment of the invention, two parallel dosing pumps are used for supplying the lubricant, which dosing pumps operate at the pressure of the impact device and supply lubricant when pressurized hydraulic fluid is supplied to the impact device, and return to the initial position when the impact device stops operation, being simultaneously filled.

An advantage of the invention is that it allows the use of simple and reliable pumps which operate reliably also in impact hammers, and at the same time, reliable lubrication of the bearing surfaces is achieved for the movement range between the tool and the impact hammer. Further, an advantage of the invention is that it can also be applied, with minor modifications, to existing impact hammers in a simple manner. Further still, an advantage of a preferred embodiment of the invention is that lubrication does not require expensive pump structures that break easily, but operates always when the working period of the impact hammer starts.

BRIEF DESCRIPTION OF THE FIGURES

The invention will now be described in greater detail with reference to the attached drawings, of which

FIGS. 2a and 2b show schematically a dosing pump suitable for the embodiment of the invention according to FIG. 1;

FIGS. 4a and 4b show schematically a dosing pump suitable for the embodiment of the invention according to FIG. 3.

DETAILED DESCRIPTION OF THE INVENTION

Figure 1:
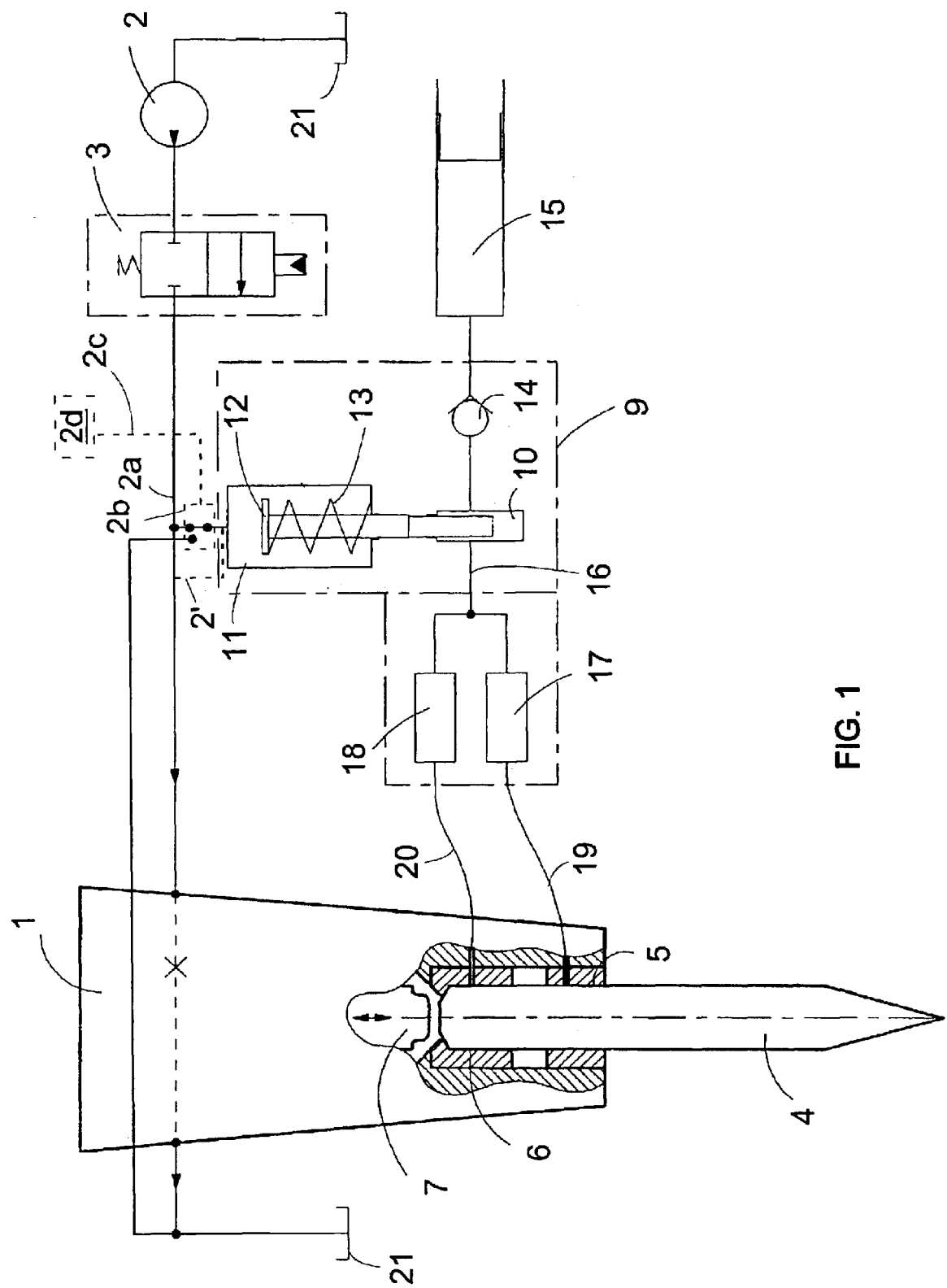
FIG. 1 shows schematically an arrangement according to the invention.

FIG. 1 shows an impact device 1 into which a hydraulic fluid pump 2 supplies hydraulic fluid. The supply of the hydraulic fluid to the impact device and thus also the operation of the impact device are controlled by a control valve 3. The impact device 1 further comprises a tool 4, which is fitted with bearings in the axial direction in a sliding manner relative to the impact device with bearings 5 and 6 mounted at the lower end of the impact device in a manner known per se. Fitting the tool 4 and the bearings 5 and 6 to each other as well as implementing the bearing are as such generally known and obvious to a person skilled in the art, and therefore there is no need to explain them in more detail. The impact device 1 further comprises a percussion piston 7 moving backwards and forwards in a manner known as such, which, when striking the upper end of the tool 4, causes the impact movement of the tool.

FIG. 1 further shows a supply pump 9 comprising a supply cylinder 10 and a working cylinder 11 connected to the hydraulic fluid channel of the impact device. Further, the supply pump 9 comprises a supply piston 12 and its return spring 13 in the working cylinder 11. Further still, it comprises a check valve 14, via which the lubricant tank 15 is connected to the supply cylinder 10. From the supply cylinder 10, a channel 16 further leads to two dosing pumps 17 and 18, which are connected to the bearings 5 and 6 through their respective supply channels 19 and 20 for supplying lubricant between the bearings 5 and 6 and the bearing surfaces of the tool 4 to lubricate them.

When the control valve 3 is switched to the using position, the pressurized hydraulic fluid from the hydraulic fluid pump 2 can flow along a channel 2a to the impact device 1, as a result of which the percussion piston 7 starts its reciprocating impact movement by means of impact equipment known per se. Such impact equipment is generally known as such and obvious to a person skilled in the art, and therefore there is no need to explain it separately. The hydraulic fluid discharging out of the impact device flows back to a hydraulic fluid tank 21. At the same time, the pressurized hydraulic fluid flows to the working cylinder 11 of the supply pump 9, pushing the supply piston 12 forwards against its return spring 13. When being pushed forwards to the supply cylinder 10, the supply piston 12 generates pressure in the lubricant in the supply cylinder 10. Since the check valve 14 prevents the lubricant from flowing back to the lubricant tank 15, the lubricant can only flow from the supply cylinder 10 to the dosing pumps 17 and 18 through the channel 16. The pressure of the lubricant, in turn, causes the dosing pumps 17 and 18 to supply lubricant through the channels 19 and 20 to the bearings 5 and 6, to the opening between their bearing surfaces and the bearing surfaces of the tool 4. Since the amount of lubricant supplied by the dosing pumps is always predetermined, a predetermined amount of lubricant is supplied to both bearing surfaces each time the impact device is started. When the impact device is stopped, the pressure in the channel 2a is decreased and the supply piston 12 is returned by means of the return spring 13. During the return movement of the supply piston 12, negative pressure is generated in the supply cylinder 10, which results in the same amount of lubricant flowing from the lubricant tank 15 via the check valve 14 to the supply cylinder 10 as was pumped forwards to the dosing valves 17 and 18 and through them to the bearing surfaces of the impact device. The operation of the dosing valves 17 and 18 is shown in more detail in FIGS. 2a and 2b. In the manner described above, the bearing surfaces of the bearings 5 and 6 of the impact device 1 and the bearing surfaces of the tool 4 receive a given amount of lubricant each time the impact device is started, and when the impact device is stopped, the supply pump returns to its rest position and new lubricant flows to the supply cylinder 10 in such a way that when the impact device next starts, a new dose of lubricant can be supplied.

FIG. 1 further shows an alternative embodiment, which is usable when long-term heavy work must be carried out in such a way that the periods between the starting and stopping of the impact device are long, and therefore there are also long intervals between lubrications. The figure shows schematically a connection element 2b, which is in this case closed in the rest position. Further, the connection element 2b is connected to a separate control unit 2d by means of a control channel or cable 2c. The control unit 2d may operate with a timer in such a way that it triggers after a predetermined time an opening and a closing function in the connection element 2b. When the connection element 2b closes the connection to the hydraulic fluid channel 2a and opens a connection to the hydraulic fluid tank 21, preferably via the discharge channel for the hydraulic fluid of the impact device, the piston 12 of the supply pump 9 can return to its rest position, causing the loading of lubricant. Correspondingly, when the connection unit reopens the connection to the hydraulic fluid channel 2a, lubricant is supplied to the impact device, as described earlier. The control unit 2d can also be controlled electrically or hydraulically with a remote controller from the control cabin of the base or with a wireless remote control system. Similarly, the user can naturally start the control unit manually adjacent to the control unit. The default being that the connection element 2b connects the supply pump 9 to the hydraulic fluid channel 2a results in the lubrication functioning each time when the impact device is restarted. For certain purposes of use, the connection element 2b with its control units can be omitted, and a connection from the hydraulic fluid channel 2a to the supply pump 9 can be opened directly, as indicated by a broken line 2'.

FIGS. 2a and 2b show schematically the operation of a dosing pump suitable for the arrangement according to the invention. FIG. 2a shows the operation of the dosing pump when the supply pump 9 illustrated by FIG. 1 supplies pressurized lubricant to the supply pump, and FIG. 2b shows a case where the operation of the impact device has been interrupted and the supply piston 12 of the supply pump 9 is returning to the rest position. FIGS. 2a and 2b illustrate the same valve in different phases of operation, so that complete numbering of the components is considered relevant only in FIG. 2a.

In the case of FIG. 2a, pressurized lubricant flows to the dosing pump 17 via the supply channel 16. The pressurized lubricant affects in a working cylinder 22 of the dosing pump 17, pushing a working piston 23 forwards in the direction of the arrow. At the same time, a protrusion 24 in the working piston 23 clogs a channel 26 in an auxiliary piston 25. A return spring 27 functions as the counterforce for the working piston 23 and the auxiliary piston 25. Between the working piston 23 and the auxiliary piston 25, there is a lubricant space 28, to which there is a connection from the lubricant channel 16 via a check valve 29. When the pressurized lubricant pushes the working piston 23 and the auxiliary piston 25 forwards, a pressure difference, i.e. negative pressure relative to the channel 16, is generated in the lubricant space 28 by the difference of the cross-sectional areas of the pistons, whereby lubricant flows as a result of the pressure difference to the lubricant space 28 via the check valve 29. At the same time, the lubricant flows from the supply space 30, which is located on the other side of the auxiliary piston 25, along the channel 19 further to the bearing surface. The working piston 23 and the auxiliary piston 25 move forwards in the direction shown by the arrow until the auxiliary piston 25 hits a stopper that can be an adjusting screw 31, for example, or alternatively a fixed stop, such as a shoulder. The travelling length of the pistons defines the amount of lubricant passing along the channel 19, and if their travelling length is always the same, the amount of lubricant to be supplied is the same at each supply time.

In the case of FIG. 2b, the supply piston 12 of the supply pump 9 of FIG. 1 is making a return movement, whereby the pressure from the channel 16 has been removed. In this case, the return spring 27 pushes the pistons 25 and 23 back to the initial position in the direction indicated by the arrow. Since the cross-sectional areas of the pistons are of different sizes, the result in this case is that pressure is generated in the lubricant space 28, which leads to the working piston 23 detaching from the auxiliary piston 25 and lubricant in the lubricant space 28 discharging via the channel 26 to the supply space 30. This continues as long as the auxiliary piston 25 reaches the rest position again. Thus, when returning to the rest position, the auxiliary piston 25 loads a new dose of lubricant to the supply cylinder 10 to be supplied between the bearing surfaces at the next working stroke. The check valve 29 prevents the lubricant from flowing from the lubricant space 28 back to the lubricant channel 16. When the supply piston 12 of the supply pump 9 shown by FIG. 1 again supplies pressurized lubricant along the lubricant channel 16, one returns to the case of FIG. 2a and the working cycle continues during the starting and stopping of the impact device in the manner described above. The second dosing pump 18 operates as the dosing pump 17. By using an appropriate adjustable stop, such as an adjusting screw or other control structure known as such, desired amounts of lubricant can be supplied at each point. Of course, this can also be done by dimensioning the dosing pumps in different manners for different objects, but with separate control the supply of lubricant can be controlled even better according to the properties and wearing of the impact device, as well as the working conditions.

Figure 3:
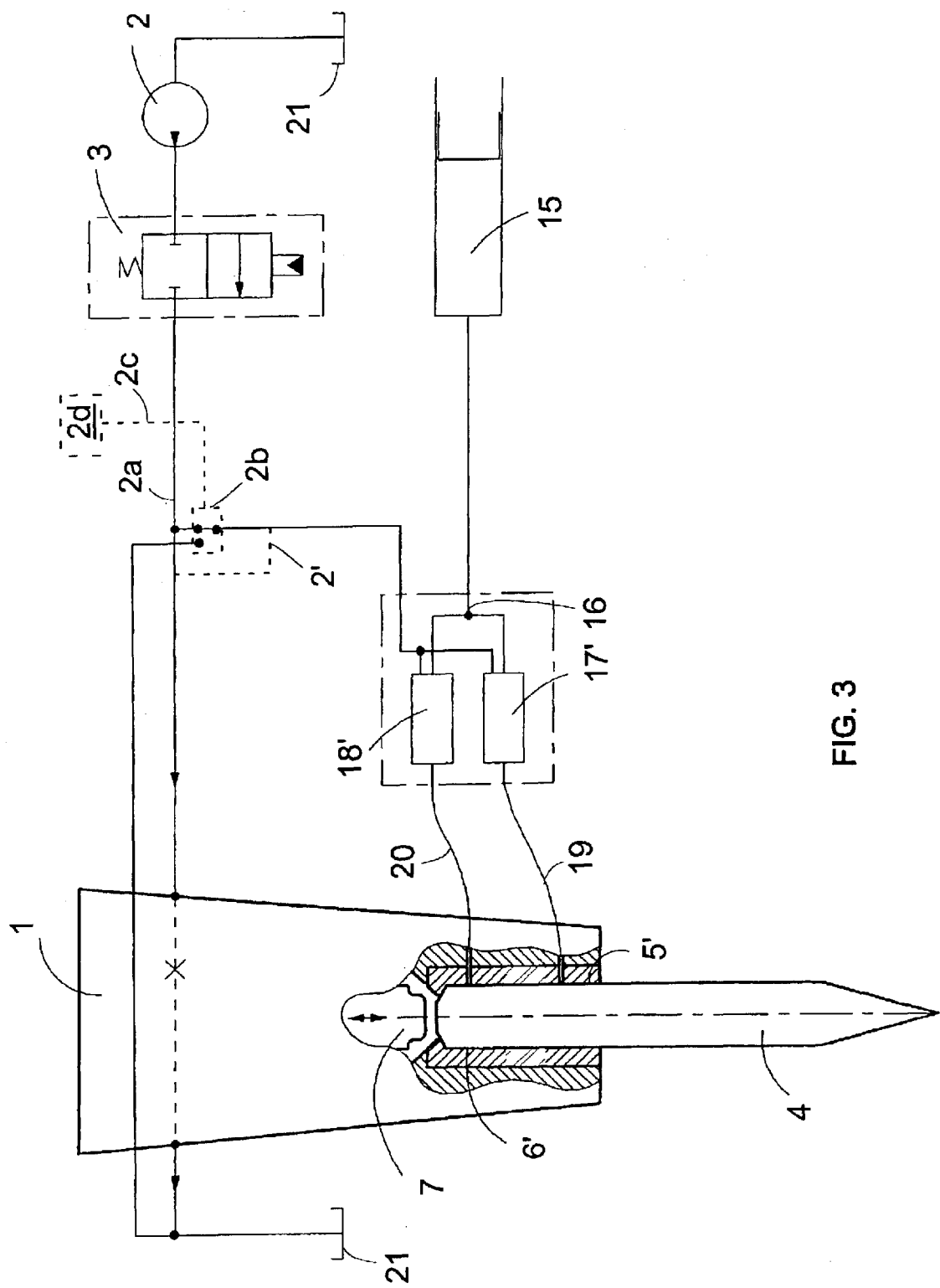
FIG. 3 shows schematically a second embodiment of the arrangement according to the invention.

FIG. 3 shows schematically a second embodiment of the arrangement according to the invention. In principle, this corresponds to a great extent to the embodiment of FIG. 1, and therefore the same parts are referred to with the same names and numerals. The essential difference compared with the embodiment of FIG. 1 is that in this case no separate supply pump 9 is used, but the dosing pumps 17' and 18' are connected directly to the lubricant tank 15 via their own check valves 29' illustrated by FIGS. 4a and 4b. Further, the dosing pumps 17' and 18' are connected to be used by the hydraulic fluid of the impact device in the manner shown in more detail by FIGS. 4a and 4b. Otherwise, the operation of the embodiment in FIG. 3 is similar to the embodiment shown in FIG. 1, and in this respect, reference is made to the description of FIG. 1. FIG. 3 also shows a solution where there is, instead of two separate bearings 5 and 6, one continuous bearing 5', which has a bearing surface over its whole length. In this case, too, lubricant is supplied to the lower and upper ends of the bearing surfaces via the channels 19 and 20. As in the solution of FIG. 1, a separate connection element with control units can also be used in the solution of FIG. 3 to provide supplementary lubrication during long and heavy working periods. Also, in the solution of FIG. 3, the connection element 2b with the control units 2d can be omitted, and only a permanent connection from the hydraulic fluid channel 2a can be opened, as indicated by the broken line 2'.

FIGS. 4a and 4b show schematically the operation of the dosing pumps 17' and 18' of the embodiment shown in FIG. 3. They show schematically the dosing pump 17', the structure and operation of which are substantially similar to those of the dosing pump 17 shown in FIGS. 2a and 2b. Thus, the same names and numerals have been used for the corresponding parts. The dosing pump 17' and thus also the dosing pump 18' shown in FIG. 3 differ from the dosing pump 17 of FIGS. 2a and 2b only what it comes to the driving force of the working piston and the channel system connected to it. FIGS. 4a and 4b show the same valve in different phases of operation, so that complete numbering is considered relevant only in FIG. 4a.

As shown in FIGS. 4a and 4b, the working cylinder 22 of the dosing pump 17' is connected directly to the hydraulic fluid channel 2a leading to the impact device. Correspondingly, the lubricant space 28 is connected via the check valve 29' directly to the lubricant tank 15. When pressure is generated in the hydraulic fluid channel 2a leading to the impact device, it pushes the working piston 23 and the auxiliary piston 25 in the way described in connection with FIG. 2a, in the direction indicated by the arrow, whereby the negative pressure generated in the lubricant space 28 absorbs lubricant via the check valve 29' from the lubricant tank 15 through the channel 16 at the same time as lubricant flows via the channel 19 to the bearing surfaces in the manner described in connection with FIG. 2a. Otherwise, the dosing pump 17' shown by FIG. 4a operates in the manner described in connection with FIG. 2a. When the pressure in the hydraulic fluid channel 2a of the impact device is reduced, the working piston 23 and the auxiliary piston 25 return in the manner described in connection with FIG. 2b, and lubricant flows from the lubricant space 28 to the supply cylinder 30. The working cycle shown by FIGS. 4a and 4b is repeated each time the impact device is started or stopped. The structure and operation of the dosing pump 18' in FIG. 3 are most preferably as those of the dosing pump 17' shown in FIGS. 4a and 4b.

It is obvious to a person skilled in the art that as the technology advances, the basic idea of the invention can be implemented in a plurality of ways. The invention and its embodiments are thus not limited to the above examples but can vary within the scope of the claims.

Deviating from the above-described embodiment, which comprises a supply pump making a linear impact movement and correspondingly a dosing pump, other kinds of supply and dosing pumps can be used as well, as long as they function in such a way that when pressurized fluid or lubricant is supplied to them, they make one supply movement and thus supply one dose of lubricant to the bearing surfaces of the tool, to the objects to be lubricated, and when the pressure in the hydraulic fluid channel of the impact device is reduced, they return to the rest position to wait for the next pressurized period.

The dosing pumps 17 and 18 as well as the supply pump 9, or only the dosing pumps 17' and 18' can be integrated in one unity in such a way that all the pumps intended for supplying lubricant in connection with the impact device form an easily mountable unity which can be connected to the impact device. Similarly, the lubricant tank 15 can be arranged to be fitted directly to the unity formed by the pumps, because the required amount of lubricant to be supplied is, on the whole, rather small, and thus it is possible to use disposable, generally available lubricant cartridges. In this way, it is often rather simple and easy to install the arrangement according to the invention even in old impact devices.

What is claimed is:

1. An arrangement for lubricating the bearing surfaces between a tool of a hydraulic impact device and the impact device, the arrangement comprising:
   a supply pump and at least two separate channels for supplying lubricant between the bearing surfaces separately, at at least two points positioned at a distance from each other in the axial direction of the tool; separate dosing pumps for the lubricant in each of the two channels;
   the supply pump has a supply piston which is displaced toward a supply cylinder in the supply pump by the effect of the pressure of the hydraulic fluid in a hydraulic fluid channel in the impact device, and correspondingly, returns to the rest position when the pressure is reduced;
   the supply cylinder of the supply pump is connected to a lubricant tank via a check valve and correspondingly to the dosing pumps via a lubricant channel in such a way that when the supply piston of the supply pump is displaced toward the supply cylinder, it pushes pressurized lubricant to the dosing pumps, and when the supply piston of the supply pump returns to its rest position, lubricant flows from the lubricant tank to the supply-cylinder via the check-valve; and
   the dosing pumps operate at the pressure of pressurized lubricant supplied to them in such a way that when pressurized lubricant is supplied to a working cylinder of each of the dosing pumps, the dosing pumps supply lubricant doses of a predetermined amount along the two channels to the space between the bearing surfaces, and when the pressure of the lubricant is reduced in the working cylinders of the dosing pumps, a piston of each of the working cylinders returns to the rest position and loads at the same time a new dose of lubricant.

2. The arrangement according to claim 1, wherein the amount of lubricant supplied by the dosing pumps is adjustable.

3. The arrangement according to claim 1, wherein all the pumps required for supplying lubricant are formed as one integrated unity.

4. The arrangement according to claim 1, further comprising a separate connection element such that, by controlling the connection element, the supply pump or the dosing pumps are connectable either to the hydraulic fluid channel of the impact device or to the channel leading to a hydraulic fluid tank in such a way that lubricant can be supplied to the bearing surfaces during the operation of the impact device.

* * * * *